United States Patent [19]

Buckley et al.

[11] Patent Number: 5,071,665

[45] Date of Patent: Dec. 10, 1991

[54] PROCESS FOR PREPARING A PROTEINACEOUS FOOD PRODUCT

[75] Inventors: Keith Buckley, Melton Mowbray; Garry D. Wills, Grantham; Gary D. Musson, Melton Mowbray; Charles Speirs, Oakham; David Primrose; John Beech, both of Melton Mowbray; Paul Gaywood, Colsterworth, all of England

[73] Assignee: Nadreph Limited, Berkshire, England

[21] Appl. No.: 632,427

[22] Filed: Dec. 24, 1990

Related U.S. Application Data

[63] Continuation of Ser. No. 308,833, Feb. 9, 1989, abandoned.

[30] Foreign Application Priority Data

| Feb. 9, 1988 | [GB] | United Kingdom | 8802934 |
| Aug. 10, 1988 | [GB] | United Kingdom | 8818941 |
| Sep. 5, 1988 | [GB] | United Kingdom | 8820829 |
| Jan. 23, 1989 | [GB] | United Kingdom | 8901399 |

[51] Int. Cl.⁵ .............................................. A23L 1/317
[52] U.S. Cl. .................................... 426/272; 426/513; 426/517; 426/646
[58] Field of Search ............... 426/641, 646, 513, 517, 426/657, 272

[56] References Cited

U.S. PATENT DOCUMENTS

| 3,882,257 | 5/1975 | Cagle | 426/646 X |
| 4,446,159 | 5/1984 | Roth | 426/517 X |
| 4,450,183 | 5/1984 | Steinberg et al. | 426/517 X |
| 4,461,779 | 7/1984 | Peters | 426/517 X |
| 4,533,358 | 8/1985 | Yoden et al. | 426/513 X |
| 4,743,461 | 5/1988 | Gellman et al. | 426/646 X |
| 4,820,535 | 4/1989 | Gibson | 426/513 X |

FOREIGN PATENT DOCUMENTS

| 421817 | 4/1968 | Australia | 426/646 |
| 964106 | 3/1975 | Canada | 426/646 |
| 59-30071 | 7/1984 | Japan | 426/646 |

*Primary Examiner*—Arthur L. Corbin
*Attorney, Agent, or Firm*—Curtis, Morris & Safford

[57] ABSTRACT

A process for preparing a proteinaceous food product comprises passing a wet dough of a mammalian and/or avian meat protein, at least part of which is functionally inert protein, between a pair of oppositely rotating rollers to form a sheet of said food product. The functionally inert protein may have been cooked or otherwise treated to impart to the protein one or more characteristics of cooked protein and/or may comprise inert scleroprotein.

7 Claims, No Drawings

PROCESS FOR PREPARING A PROTEINACEOUS FOOD PRODUCT

This application is a continuation of application Ser. No. 07/308,833, filed Feb. 9, 1989, now abandoned.

FIELD OF THE INVENTION

This invention relates to proteinaceous food products, which may be suitable for use either in human food or in an animal food such as petfood.

BACKGROUND OF THE INVENTION

Various processes for preparing meat analogues from generally vegetable protein sources have been proposed in the past. U.S. Pat. No. 2,682,466, U.S. Pat. No. 2,802,737, U.S. Pat. No. 2,830,902 and U.S. Pat. No. 3,142,571 are examples of proposals for preparing meat analogues from such protein sources as soy bean isolate and peanut protein isolate. Another example is GB-A-1418778, which discloses the preparation of a meat analogue starting from a dry mix of proteins, starches and/or gums. All the above processes may be regarded as examples of meat analogue generation.

Roll-refining is a process which is known for producing proteinaceous food products. GB-A-1432278 describes the roll-refining largely on non-meat proteins, although one of its examples, instead of starting with soya protein or casein, begins with "ground meat", soya protein, water and other additives and another of its examples begins with "ground meat", water, casein rennet and other additives.

For the food-stuff manufacturer, who has a choice between either meat protein or non-meat protein sources, it would be preferable in many instances to use meat proteins so that an all-meat product can be prepared. Roll-refining has successfully been applied to raw proteins of vegetable origin, and it would be desirable to apply the same technology to meat proteins.

GB-A-2198623 discloses the roll-refining of fish protein. However, when attempts are made to apply the roll-refining technology to proteins from higher animals (mammals and birds), the process is unworkable since it has generally been found that it is not possible to form a sheet of proteinaceous product from raw mammalian or avian meat unless substantial amounts of additives, such as binding materials are mixed with the meat prior to the process for forming the proteinaceous sheet. Where untreated mammalian or avian meat with no additives has been used, a cohesive sheet is not formed. Sheet products are particularly useful as they may be folded or otherwise used to give a layered structure resembling meat, particularly when cut into chunks.

SUMMARY OF THE INVENTION

It has now been surprisingly found by the present inventors that where at least part of the mammalian or avian meat is functionally inert, a cohesive sheet may be formed without the use of additives such as binders being necessary.

This is a surprising finding since mammalian and/or avian meat which is entirely functionally active is not capable of forming a cohesive sheet, and so it is highly unexpected that functionally inert mammalian and/or avian meat would form a cohesive sheet. Further, it is also surprising that the presence of functionally inert proteins appear to be essential to achieve any form of sheet product.

According to a first aspect of the present invention there is provided a process for preparing a proteinaceous food product, the process comprising passing a wet dough of a mammalian and/or avian meat protein, at least part of which protein is functionally inert protein, between a pair of oppositely rotating rollers to form a sheet of food product.

According to a second aspect of the present invention there is provided a sheet or portion of a sheet of proteinaceous food product wherein the product comprises roll-refined protein substantially all of which protein is of mammalian and/or avian meat. The term "meat" includes meat and/or meat by-product.

DESCRIPTION OF CERTAIN PREFERRED EMBODIMENTS

The term "roll-refined" refers to material which has been passed between a pair of oppositely rotating rollers.

The term "product" refers to the material having passed between the rollers.

The term "functionally inert protein" refers to protein having a gel-strength value of from 0 g to 400 g, except where the protein has been cooked or otherwise treated to impart to the protein one or more characteristics of cooked protein, and the cooked or otherwise so treated protein has a gel-strength value of greater than 400 g; the term "functionally inert protein" then refers to protein having a gel-strength value of less than 70% of the gel-strength value of the protein prior to being cooked or otherwise so treated.

It is preferred that the functionally inert protein have a gel-strength value of from 0 g to 400 g. More preferably, the gel-strength value is less than 350 g, for example less than 300 g. In various embodiment, the gel-strength value is greater than 20 g, typically greater than 50 g and preferably greater than 100 g. Particularly preferred gel-strength values are greater than 200 g and some of the most acceptable values are greater than 250 g. For reasons of palatability the most preferred range is from 250 g to 300 g.

In the circumstances where functionally inert protein refers to protein having a gel-strength value of less than 70% of the gel-strength value of the protein prior to being cooked or otherwise so treated, it is more preferred that the protein has a gel-strength value of less than 60% of the gel-strength value of the protein prior to being cooked or otherwise treated.

In general, in these circumstances, the gel-strength value of the functional inert protein may be greater than 20%, more usually greater than 35%, or more than 40% of the gel-strength value of the protein prior to being cooked or otherwise treated.

The gel-strength value may be measured using the method to be described below.

The minimum content of functionally inert protein is generally 2% by weight of the wet dough, although greater quantities of functionally inert protein, for example at least 5% or 10% may be used in practice. The wet dough may additionally include flavour and/or texture enhancing agents. Aluminium hydroxide is a suitable texture enhancing agent, which may be used in amounts of from 5 ppm to 100 ppm, for example about 50 ppm. Fat is preferably present in the initial wet dough in a small proportion, typically 5 to 15%, for example about 10%.

The sheet of food product has at least one dimension, and preferably two dimensions of at least 3 cm, preferably at least 10 cm, most preferably at least 100 cm or 1 m or more in length.

The term "meat and meat by-products" includes animal organs, smooth muscle, skeletal and/or heart muscle and connective tissue. Preferred examples of these categories of meat and meat by-products include treated animal carcass products, such as pork skin and greaves, internal organs such as liver and minced meats, for example prepared from skeletal muscle. It has been found that powdered meat meal is also a suitable form of treated protein. The term meat meal includes meat and bone meal; and when meat and bone meal is used it is desirable that the treatment of the protein includes treatment with a cross-linking agent such as propylene glycol alginate.

It will be noted that the initial mass of protein is wet. Generally speaking, the dough may contain from 15 to 95% water. Often, the wet dough will contain from 20 to 70% water.

The product may contain from 15 to 95% water, which is similar in water content to the wet dough, and preferably contains from 20 to 70% water.

In one preferred feature, the functionally inert protein has been cooked or otherwise treated to impart to the protein one or more characteristics of cooked protein.

In this preferred feature, the functionally inert protein will generally have been functionally active prior to being cooked or otherwise treated. It will generally be particulate, i.e. formed of discrete particles, rather than be a continuous sheet or film at this stage.

The protein of the wet dough may further comprise a minor amount of protein which has not been cooked or otherwise treated prior to being passed between the rollers, for example, less than 50% by weight such as up to 20%, 30% or 40% by weight of the total dry amount of protein of the wet mass. It should be noted, however that the presence of such untreated protein is not at all essential to the invention.

Preferably substantially all of the protein of the wet dough has been cooked or otherwise treated prior to being passed between the rollers.

It is surprising that, given the wet dough of protein has been treated to impart to the protein characteristics of cooked protein, the process is capable of forming a sheet of food product; it would be expected that the treated wet dough would effectively be denatured and be incapable of being successfully further treated in this way.

By "characteristics of cooked protein" is meant characteristics such as water holding ability, heat coagulability and/or, emulsifiability. One or more of such characteristics (and preferably all of them) may be completely absent or substantially impaired.

The treatment of the protein to impart to its characteristics of cooked protein may be heat treatment, chemical treatment or treatment with radiation.

Heat treatment is generally achieved by cooking or rendering at from 60° to 130° C. (external temperature) for example for from 15 to 120 or 240 minutes, for example 80° C. to 130° C. for at least 15 minutes. Longer cooking times, for example up to 400 or 500 minutes may sometimes be used. The pressure at which cooking takes place may be atmospheric (either at sea level or higher altitudes) or above atmospheric, for example 0.5, 1.0 or 1.5 atmospheres ($0.5 \times 10^5 kNm^{-2}$, $1 \times 10^5 kNm^{-2}$ or $1.5 \times 10^5 kNm^{-2}$) gauge pressure.

Rendering may be by any of the methods employed for rendering raw meats. These include batch dry rendering, e.g. conventional batch dry rendering with mechanical defatting or solvent defatting; continuous dry rendering, with screw press defatting; semi-continuous wet and dry rendering, with centrifugal defatting; and wet or steam rendering with autoclave type equipment.

Whichever of these or other methods is used, the raw material is heated in order to sterilise or liberate the components for the succeeding separation. Water, fat and meat are at least partially separated.

A conventional batch dry rendering method is generally performed in an apparatus comprising a jacketed vessel which is indirectly heated by steam being passed into the jacket. Raw material to be rendered is heated, sterilised and a major proportion of the water is evaporated. The heating period may be several minutes or several hours, for example, 3 hours. The contents of the vessel are then generally drained of free fat and optionally further defatted.

The continuous dry rendering method differs from conventional batch dry rendering process described above in that the flow of material into and out of the vessel is continuous and that the material is generally treated at atmospheric pressure.

A semi-continuous wet and dry rendering method generally comprises cooking and sterilising the material above atmospheric pressure, for several minutes or several hours, for example, 1 hour. The fat is generally continuously removed and purified, before the fat-depleted matter is dried. The fat-depleted matter is then dried and discharged as dried meal.

Suitable chemical treatments include acid treatment, alkali treatment or treatment with a cross-linking agent. Acid treatment includes treatment in an acidic medium (e.g. pH3 to pH6 typically 3.5 to 5.5) for a period of time ranging from a few seconds (e.g. 2 seconds) or a few minutes (e.g. 5 minutes) to a few hours (e.g. 3 hours). Alkali treatment includes treatment in an alkaline medium (e.g. pH8 to pH12, typically 8.5 to 10.5) for a period of time ranging from a few seconds (e.g. 2 seconds) or a few minutes (e.g. 5 minutes) to a few hours (e.g. 3 hours). The more extremely acid or alkaline the treatment medium is, the shorter the treatment time will generally be. Cross-linking agents which may be used to include aldehydes, metal salts and/or propylene glycol esters such as propylene glycol alginate. Low toxicity will be a prime consideration in choosing an appropriate cross linking agent. The chemical cross-linking agent may be used in an amount of from 0.05 to 5%, for example 0.5 to 2.5%. Concentrations in the order of 1% would be typical. (All percentages are expressed in terms of weight.) Treatment by cross-linking agent is especially preferable when the wet mass has a significant amount of collagenous material. When a cross-linking agent is used, the pH of the wet mass may range from 7 to 11, for example from 8.5 to 10.5. A pH of 9.5 is typical.

Radiation treatment includes ionisation treatment.

In another preferred feature, the functionally inert protein comprises inert scleroprotein. In this preferred feature, the product comprises inert scleroprotein. The term "scleroprotein" includes fibrous proteins such as collagen, elastin and keratin. The term "inert scleroprotein" refers to scleroprotein which does not substantially comprise gelatin and which is not substantially convertible to gelatin under the conditions of the present invention. The protein may comprise scleroproteins which are not inert and/or proteins other than scleroproteins such as meat or meat products.

The gelatin content of the proteinaceous food product is generally less than 20% and preferably less than 10%, or 5%, by weight of the protein content.

The gelatin content of the proteinaceous food product of the invention can be determined as follows.

10 g of product are weighed out onto a 250 ml beaker. 125 ml water are added and the contents of the beaker are brought to the boil with constant stirring. 0.5 ml glacial acetic acid is added. The mixture is then digested on a steam bath for 15 to 30 minutes.

The mixture is filtered through a No. 4 Whatman paper into a 250 ml volumetric flask, and the filtrand washed with hot water.

The filtrate is cooled and made up to 250 ml with water. 25 ml of the diluted filtrate is pipetted into a procelain dish and 0.25 ml formalin added, and mixed thoroughly with a glass rod. This mixture is concentrated to a thick consistency, and a further 0.25 ml formalin added, with thorough mixing. The mixture is spread evenly over the base to within 2.5 cm of the rim, and baked hard on a boiling steam bath for 2 hours.

The contents of the dish are extracted twice with 100 ml of diluted formalin (2.5 ml formalin diluted to 100 ml with water) at 40° C., and maintained at 40° C. throughout each extraction, each of which takes approximately 1 hour.

Each washing is filtered through a No. 54 Whatman paper. During the final extraction, the complex is broken up. The complex is loosened and transferred to the filter paper, and washed with a further 100 ml of the dilute formalin solution at 40° C.

The nitrogen content in the gelatin-formaldehyde complex is determined by Kjeldahl method as follows.

A portion of the gelatin-formaldehyde complex sample expected to contain about 0.03 to 0.04 g N is weighed out and transferred to a Kjeldahl digestion flask. 0.7 g mercuric oxide, 15 g powdered potassium sulphate and 40 ml concentrated sulphuric acid are added. The flask is heated gently in an inclined position until frothing ceased, and the contents are then boiled briskly for 2 hours. The flask and contents are allowed to cool. Approximately 200 ml of water and 25 ml sodium thiosulphate solution (80 g/l) are added and mixed. A piece of granulated zinc is added, and sufficient sodium hydroxide solution (450 g/l) is poured carefully down the side of the flask to make the contents strongly alkaline (about 110 ml). Before mixing the acid and alkaline layers, the flask was connected to a distillation apparatus incorporating an efficient splash head and condenser. To the condenser a delivery tube which dips just below the surface of a pipetted volume of standard acid contained in a conical flask received is fitted. The contents of the digestion flask are mixed, and then boiled until at least 150 ml distil into the receiver. 5 drops of methyl red indicator solution (0.5 g/200 ml ethanol) are added, and a filtration is performed with 0.1 M sodium hydroxide. A blank filtration is carried out. Since 1 ml of 0.1 M hydrochloric acid or 0.05 M sulphuric acid is equivalent to 0.0014 g N, and the gelatin content is 5.55 times the N content, the gelatin content of the product is calculated.

In this preferred feature, the amount of inert scleroprotein in the total protein in the product is preferably greater than 2% by weight of inert scleroprotein based on the total amount of protein. A more preferred minimum is 5% by weight, more preferably 10% by weight, still more preferably 20% by weight, and most preferably 30% by weight of inert scleroprotein based on the total amount of protein. Preferred amounts of other functionally inert proteins apart from scleroproteins are the same.

The protein content of the product may be comprised substantially solely of inert scleroprotein, thus, numerically the maximum is 100% of the protein content of the product being scleroprotein. Depending on the effect upon the appearance or the nutritional, textural or palatability properties required, the scleroprotein content of the protein may be less than 80%, less than 60% or less than 50%. Again, preferred amounts of other functionally inert proteins apart from scleroproteins are the same.

The inert scleroprotein may be provided by selecting natural scleroproteins which have a low gelatin content or which have a low tendency to convert to gelatin. Thus scleroproteins which are high in elastin or keratin or highly cross-linked collagen is particularly suitable. Mature cattle hide, dried epidermis, tendons and paddywacks (ligamentus nuchae) are examples of suitable sources of scleroproteins.

The collagen and/or the elastin content of the product and/or of the proteinaceous mass may be determined by the methods described in "Determination of the Collagen, Elastin and Bone Content in Meat Products Using Television Image Analysis", by Goetz Hildebrandt and Lesley Hirst, pg. 568, Journal of Food Science, Vol. 50 (1985).

The keratin content and the total protein content of the product and/or the proteinaceous mass may be determined by the method described in "Ion Exchange Column Chromatography for the Determination of Keratin in Meat Meals", by J Csapo and Zs. Csapo-Kiss, pp 137-150, Acta Alimentaria, vol. 15(2) (1986).

The amount of inert scleroprotein in the total protein of the product and/or the proteinaceous dough may be determined by first removing the gelatin by extraction with water, after heat treatment to convert to gelatin where necessary, and the amount of scleroprotein remaining compared with the total amount of protein before treatment and/or gelatin extraction.

Scleroproteins which are not inert may be made inert by heat treatment or chemical treatment. Thus, for example, collagen which is not highly cross-linked may be heat treated and removable gelatin removed prior to passing of the wet protein mass between the rollers.

Where the source of the scleroprotein has a high gelatin content or a high content of scleroproteins which are convertible to gelatin and would otherwise lead to a proteinaceous food product containing an excessive amount of measurable gelatin, several means may be employed to ensure that the amount of gelatin of the product is of a satisfactory level, for example by treatment of the scleroprotein of the starting material. Where there is a high content of hydrolysable collagen the amount of hydrolysable collagen in the scleroprotein may be reduced by reacting (e.g. by heating) the scleroprotein with a collagen crosslinking agent. Preferred collagen crosslinking agents are dialdehydes such as glutaraldehyde and dialdehyde starch, di- and poly-carboxylic acids and their active derivatives (such as succinoyl dichloride) and propylene glycol alginate. Other suitable crosslinking agents may be used. Preferably these collagen crosslinking agents are present in the scleroprotein at a level equal to or greater than 8% by weight of the original collagen content of the scleroprotein. Suitable methods and details with respect to cross-linking are given in "Protein Crosslinking, Biochemical and Molescular Aspects" by M. Friedman, 1977.

Alternatively or additionally the amount of collagen in the raw materials which would lead to measurable gelatin in the product being in excess may be reduced by effecting the prior conversion of collagen of the scleroprotein to gelatin and non-gelatin polypeptides and washing these from the animal mass (that is to say prior to passing a wet mass of protein between a pair of oppositely rotating rollers).

Suitable means of effecting the conversion of collagen to gelatin and washing gelatin from the scleroprotein include blanching in boiling water resulting in the leaching and subsequent washing away of the gelatin.

Suitable methods and details for converting collagen to gelatin are given in "The Macromolecular Chemistry of Gelatin" by A. Veiss, Academic Press, 1964.

The use of inert scleroprotein in the present invention has the additional advantage of conferring an aesthetic appeal to the product.

The scleroprotein may be in the form of comminuted wet cattle hide, dried hide or re-constituted hide.

In another embodiment, the scleroprotein may be added to other proteins in the form of a ground mix of, for example, ground hide, such as dry bovine collagen powder.

For the purpose of storage and preservation of hides, these may be treated by such processes as drying or curing in salt or pickling in alkali or pickling in acid. Thereafter, the hide should be washed and/or neutralised before undergoing a process in accordance with the present invention, as will be known to those skilled in the art. Further details can be found in "The Leather Industry" by J. H. Sharphouse in Applied Protein Chemistry (1980). Ed. R. A. Grant Applied Science Publishers or "The Leather Technicians Handbook" (1975) Leather Producers Association London.

For example, pickling in lime at approximately pH9 to pH13, such as pH12 of a source of scleroproteins which naturally has a higher than desired gelatin content or content of gelatin-convertible collagen, such as young pig skin, leaches the gelatin and preserves the scleroprotein source. Limed cattle hide may be delimed bringing the pH from about 12 to 7. The material may be washed to remove free gelatin and dehydrated and degreased by immersing it in acetone. The hide may then be dried to about 12% moisture by air drying. The dried hide may be powdered and used as an ingredient in the wet mass of protein to be roll-refined.

The protein will generally be particulate, i.e. formed of discrete particles, rather than be a continuous sheet or film at this stage.

The wet mass may additionally include flavour and/or texture enhancing agents. Aluminium hydroxide is a suitable texture enhancing agent, which may be used in amounts of from 5 ppm to 100 ppm, for example about 50 ppm. Fat is preferably present in the initial wet mass in a small proportion, typically 5 to 30%, more typically 20 to 25%.

The rollers will generally bear one on the other and be urged together by a force, which may typically range from 10 to 1000 psi ($7 \times 10^3$ to $7 \times 10^5$ kg/m$^2$). Preferred pressures are within the range of from 250 to 750 psi ($1.8 \times 10^5$ to $5.3 \times 10^5$ kg/m$^2$) and may be in the order of 500 psi ($3.5 \times 10^5$ kg/m$^2$). The surface velocity of one roller may be greater than the surface velocity of the other roller at the point where the two rollers bear on each other. This may be achieved either by having one roller rotating at a faster speed than the other, or by having rollers of different diameter, or by a combination of these factors. When the mass of meat or meat by-product being processed is fed between two rollers whose surface velocities are different, the tendency is for the sheet or film of food product being formed to stretch and for the sheet or film to tend to form on, or be transferred to, the faster roller.

It will be appreciated that it is possible to have more than two rollers. It can be seen that n rollers can be arranged to cooperate in n−1 pairs. For example, three rollers can be arranged as two co-operating pairs with the middle roller being common to the first pair and the second pair. It is preferred for the rollers successively encountered by the food product being formed to have successively increasing surface velocities, for imparting stretch, in the manner described above, to the product being formed, and for transferring the product being formed from one roller to another. The surface velocities may increase at a ratio of, for example, from 1.5 to 2.5 between successive rollers.

The roller temperature is not believed to be critical, and the temperature of the protein on the roller may range for example from 4° to 95° C.; it is only necessary that the roller temperature be kept such that the overall process is workable. Typically, the product on the rollers may be kept about 40° C. There may be some advantages in keeping the roller substantially above room temperature, so that the temperature of the protein on the roller is in the range, for example from 40° to 80° C., in that it may be possible during processing partially to cook the food product being formed, or to reduce the bacterial count of the food.

Thus, it has been found to be particularly advantageous to use heated rollers or to apply heat to the food product when it is on or after it leaves the rollers. This is particularly beneficial when some of the protein has not been cooked or otherwise treated prior to being passed between the rollers.

Where a heated roller is used, the temperature of the protein on the roller will preferably be greater than 50° C., more preferably greater than 70° C., and still more preferably greater than 80° C. The protein temperature on the roller will generally be less than 200° C., preferably less than 95° C. It is particularly preferred that the protein on the first roller which the protein contacts is at a temperature of less than 50° C., while a subsequent roller is heated. This is believed to stretch and shear the protein on the first roller and to set the product on the subsequent roller.

The rollers may be heated by passing a hot fluid, such as hot water, or where temperatures greater than 100° C. are required, hot oil or super-heated steam through the rollers.

Alternatively or additionally heat may be applied to the food product coming off the roller and this may be done by passing the food product through a steam tunnel or a hot air tunnel, or by directing a heat source such as an infra red lamp onto the protein either on the roller or after it has left the roller. The food product may be formed into chunks or spheres by compressing before the application of heat.

The profile of the rollers may be smooth. Alternatively, it is possible for the surface of the rollers to be formed with protrusions and/or indentations, for example, in the form of corrugations. This may impart desirable qualities of texture to the food product being formed.

The food product may be removed from the or any of the rollers in any appropriate manner. It has been found convenient to use a doctor blade effectively to scrape the product off the last roller to which the food product being formed has been transferred. The doctor blade will generally lie parallel to a longitudinal axis of the last roller and bear on the surface of the roller, generally being inclined towards the source of the food product being formed A suitable pressure for the doctor blade will readily be ascertainable by one skilled in the art; it may range from a very light pressure (such as a few, e.g. 5, kg/m$^2$) up to pressures that compare with or are higher than pressures exerted between two rollers. As an example, the doctor blade may bear against the last roller at a pressure in the order of 250 psi ($1.8 \times 10^5$ Kg/m$^2$). Collecting the food product by means of a doctor blade results in the food product being collected in a sheet-like form. It will be appreciated that the sheet may be allowed to form to a relatively large area, or may be chopped, cut, torn or otherwise reduced in size (laterally and/or longitudinally) as it emerges from the rollers.

The sheet may be subjected to further processing, for example: (a) folding the sheet to form a layered structure; (b) baking the sheet to form a biscuit-like structure; and/or (c) setting the sheet in a gel-like matrix.

Often the sheet will be allowed to fold onto itself, and this may form the requisite layered structure described under (a) above. The weight of the sheet itself may be sufficient to give sufficient density to the layered structure, but pressure may alternatively be applied to increase the density of the structure. The pressure will generally be in the order of from 0.1 to 2 atmospheres ($1 \times 10^4$ to $2.1 \times 10^5$ kg/m$^2$), for example in the order of 1 atmosphere ($1 \times 10^5$ kg/m$^2$). All pressures are gauged pressures. The addition of such pressure may be conveniently effected in a mould. The layered structure may be cut into chunks, simulating the appearance of cubes of meat. The chunks may subsequently be cooked, for example in a can (and/or in gravy).

Alternatively or additionally, the sheet may be taken from the final or downstream roller and baked to form a biscuit-like structure as described under (b) above. Baking will generally be carried out above 100° C., for example at a temperature of from 100° to 250° C. Baking temperatures of 150° to 200° C. are typical. Baking may conveniently be done in an oven, which in a continuous process will be located downstream of the final or downstream roller.

Further in the alternative or additionally, the sheet may be set in a gel-like matrix. Before so setting, the sheet can be shredded or dried, depending on the desired effect to be achieved.

The food product may be set in a gel-like matrix by causing it to come into contact with (for example by immersion) a fluid capable of forming a gel-like matrix. The fluid may consist of known gelable meat mixtures known in the art, such as blood, comminuted meats and offal and fat mixtures as used in sausages and meat puddings. Such systems are believed to depend on the denaturation and gelation of proteins to effect texturisation through the addition of salts and/or the application of heat. The fluid may also contain, either as well as or instead of the above ingredients, plant gums or mucilages, which will in general contribute to the texture of the medium. Where desirable for reasons of product aesthetics, the fluid can have a portion or all of the animal protein replaced by vegetable proteins such as soy or wheat gluten.

Typically, therefore, the composition of the fluid can therefore comprise from 0.1 to 30%, e.g. 5 to 15% protein, with the residue being water, fats, flavours, colours, gums and/or thickeners, and cofactors for each or any of them. Protein may alternatively be absent, in which case a different gelling agent, such as a carbohydrate gelling agent, is used. Food product obtained either directly or indirectly from the rollers can be added, typically at a level of from 5 to 10%, to the fluid, after which the combined system is used to set, for example by inducing gelation and/or thickening. The precise method of setting is not important and will depend on the functional properties of such gelling and/or thickening agents as are present. For example, proteinaceous agents such as albumins or caseins may be heat set, while plant gums such as alginates and pectates may be gelled with calcium or other (generally divalent) metal salts, or hot carrageenan solutions merely left to gel on cooling.

The effect of setting the product initially obtained as a sheet will be to provide striations and fracture points within a comparatively amorphous gel. It is then possible, once the gel has set, to break it in irregular pieces or chunks, and a meat-like appearance will be evident in many cases. The pieces or chunks may subsequently be cooked, for example in a can (and/or in gravy).

Depending on their moisture content (which can subsequently be increased or decreased as desired), products produced by a process in accordance with the invention can either be used on their own or as incorporated ingredients in human or animal foodstuffs, and in particular in petfoods.

It will be appreciated that the further processing of the sheet may include all permutations and combinations of each and any of variants (a), (b) and (c).

The invention also extends to cover products of a process or processes as described above.

The gel-strength of proteins can be measured by the following process:

Proteinaceous material is deep frozen. 7.5 g of deep frozen proteinaceous material is pre-broken through a grinder to form pellets of 5–10 mm in size. The proteinaceous material is then finely comminuted to an average particle size of less than 0.75 mm, whilst keeping the temperature to below 5° C. using, for example, a COMITROL apparatus.

100 ml distilled water at 20°–25° C. is placed in a 250 ml beaker and stirred vigorously using a magnetic stirrer to give a deep vortex. The proteinaceous sample is gradually added, and stirred for a further 1 hour. Five aliquots of 6 ml of the protein dispersion are transferred to plastic sample pots. It is ensured that there are no air voids in the samples by pushing the samples down with a spatula.

The plastic sample pots are placed in an aluminium heating block which is at 83° C.±2° C. Plastic breaking figures are inserted in the centre of four of the pots and the lids are gently secured on to the pots. A thermometer is secured in the centre of the fifth pot in order to monitor the temperature of the protein dispersion. The samples are heated to 80° C.±2° C., and held at this temperature for 30 minutes.

The samples are removed from the heating block using forceps and transferred to an incubator maintained at 20° C.±1° C. The sample gels are allowed to stabilise for 5 hours.

A standard JELLOTRON machine (available from Precision Varionics Ltd, Cheltenham, Gloucestershire, UK) is calbrated using a standard 200 g weight placed on the base of the JELLOTRON and the weight is hooked on to the pulley attachment.

The position of the hook is adjusted such that the weight is not lifted, and the instrument is set to zero. The weight is then lifted for approximately 5 seconds. On releasing, the weight is printed out in grams, and the calibration sequence is repeated five times until a consistent value of 200 g is achieved.

The lids are carefully removed from the sample pots without disturbing the plastic breaking figures.

The hook of the JELLOTRON is inserted into the ringed portion of the breaking figure, taking care not to disturb the breaking figure.

The JELLOTRON instrument is set to zero and the breaking figure in the gel sample is lifted for 5 seconds. On releasing the weight (g) is printed. The load (g) printed out represents the maximum load to pull the probe out of the gel and is referred to as the gel strength.

This method is based on "A Standard Gelation Test For Heat-Setting Proteins" (Leatherhead Food RA Research Report 633 November 1988).

The invention will now be described with reference to the following examples.

EXAMPLE 1

Pork skin was steam rendered at 95° C. for 60 minutes. The resulting slurry was passed over a separation sieve and the solids retained. This gave a reduced material containing 65% water, 15% fat and 25% protein. The rendered pork skin or greaves was finely ground, cooled to 4° C. and intimately mixed with 1% by weight of propylene glycol alginate. The rendered pork skin mixed with propylene glycol alginate had a gel-strength value of 140 g. Anhydrous sodium carbonate was added with further mixing to raise the pH of mixture to 9.5 before immediately passing the material through a series of rollers. A triple roll mill was used where the top roll speed was 250 rpm, the middle roll 110 rpm and the bottom roll 50 rpm. The pressures between the rolls were 500 psi and the roller temperature was maintained at 40° C. The sheet was collected from the top roller by the action of a doctor blade exerting a pressure of 250 psi. The sheet was folded back upon itself to give a block of layered material. The block was then cubed to give meat-like pieces or chunks. The chunks which were generally cubic and had the appearance of fresh meat were filled into a can and heat processed with a gravy to attain commercial sterility.

EXAMPLE 2

A quantity of fresh ox trachea was minced and steam rendered at 128° C. for 60 minutes and separated from its juices. The rendered ox trachea had a gel-strength value of 390 g. The material obtained was passed directly through a series of rollers and subsequently processed as described in Example 1.

EXAMPLE 3

The process of Example 2 was followed except that beef flank which had been minced and rendered at 95° C. for 15 minutes was used. The rendered beef flank had a gel-strength value of 350 g.

COMPARATIVE EXAMPLE 3A

The process of Example 3 was followed except that raw minced beef flank was used as the feedstock for the roller mill. In this instance an integral sheet was not obtained; instead, an emulsion-like mass was formed and no chunks could be formed from the product of the roller mill. The raw minced beef flank had a gel-strength value of 600 g.

EXAMPLE 4

The process of Example 1 was followed except that fresh minced pig skin with 1% by weight added propylene glycol alginate was used. The propylene glycol alginate treated pig skin had a gel-strength value of 150 g. This gave a material with meat like appearance. 95% of the total protein was inert scleroprotein in the product which came off the roller.

COMPARATIVE EXAMPLE 4A

The process of Example 4 was followed except that the propylene glycol alginate was omitted. Integral sheets were not obtained from the roller mill. The fresh minced pig skin had a gel-strength value of 440 g.

EXAMPLE 5

The process of Example 1 was followed except that the propylene glycol alginate addition step was omitted The rendered pig skin had a gel strength value of 180 g. A sheet was formed, which was folded to a layered structure, which in turn was cut into chunks. The layered structure of the resultant chunks was quite acceptable but had reduced thermal process stability.

EXAMPLE 6

Rendered pork skin was processed in the manner of Example 1 and a sheet of proteinaceous food product was collected from the rollers. The sheet was shredded and passed into a bath of bovine blood plasma which contained 50% by weight of finely minced meats. Rendered pork skin sheet was added to the bath in the proportion of 10% by weight of the meats and plasma The resultant combination was heat set by raising the temperature of the mixture to 80° C. and holding for five minutes. The set mixture was diced at which point the advantage of including the protein sheet could be seen with increased meat-like appearance over comparative plasma and meat chunks where the protein sheet was absent. The chunks were then heat processed in the manner described in Example 1.

EXAMPLE 7

The process of Example 1 was followed, except that an aldehyde was used as a protein cross linking or tanning agent. Glutaraldehyde was added, instead of the propylene glycol alginate and the sodium carbonate, to the minced rendered pork greaves at 2%. The glutaraldehyde treated protein had a gel-strength value of 170 g. This was processed as described in Example 1 to give a product of similar appearance, to the product of Example 1. 90% of the total protein was inert scleroprotein in the product which came off the roller.

EXAMPLE 8

The process of Example 1 was followed, except that a metal salt was used as an additional protein cross linking or tawing agent. Aluminium hydroxide was added to rendered pork greaves at a 50 ppm level and processed as described in Example 1 to give a meat like chunk with an improved structure compared to that formed in Example 1. The aluminium hydroxide and propylene glycol alginate treated rendered pork greaves had a gel-strength value of 170 g. 97% of the total protein was inert scleroprotein in the product which came off the roller.

EXAMPLE 9

The process of Example 5 was followed, except that animal whole blood was used in place of bovine plasma and a similar product was formed.

EXAMPLE 10

The process of Example 5 was followed, except that porcine plasma was used in place of bovine plasma; a similar product was formed.

EXAMPLE 11

Rendered beef lung (500 kg) was finely ground to form a liquid slurry to which was added starch (350 kg) and wheat gluten (150 kg). The rendered beef lung had a gel-strength value of 340 g. The slurry was passed through a series of rollers as described in Example 1. The protein sheet obtained was baked at 180° C. to form a biscuit like texture. The sheet was then added at 5% inclusion level to a bath containing a mixture of slurried liver (50%) and blood plasma (50%). The conglomerate was heated to 80° C. and subsequently processed as described in Example 1 to give a meat like chunk.

EXAMPLE 12

The process of Example 11 was followed, except that the rendered beef lung was replaced with rendered pig skin. The rendered pig skin had a gel-strength value of 180 g. An acceptable chunk was formed.

EXAMPLE 13

The process of Example 11 was followed, except that the beef lung was replaced with rendered beef casings having a gel-strength value of 340 g; an acceptable chunk formed.

EXAMPLE 14

100Kg of Dutch low grade meat meal was rehydrated up to a moisture content of 65% with hot water. The product was cooled to 4° C., and intimately mixed with 1% by weight of propylene glycol alginate. The gel-strength value of the rehydrated meat meal and propylene glycol alginate was 260 g. Anhydrous sodium carbonate was added with further mixing to raise the pH of mixture to 9.5 before immediately passing the material through a series of rollers. A triple roll mill was used where the top roll speed was 250 rpm, the middle roll 110 rpm and the bottom roll 50 rpm. The pressures between the rolls were 500 psi and the roller temperature was maintained at 40° C. The sheet was collected from the top roller by the action of a doctor blade exerting a pressure of 250 psi. The sheet was folded back upon itself to give a block of layered material. The block was then cubed to give meat-like pieces or chunks. The chunks which were generally cubic and had the appearance of fresh, meat were filled into a can and heat processed with a gravy to attain commercial sterility.

EXAMPLES 15, 16, 17, 18 and 19

Examples 1, 3, 4, 8 and 14 were repeated, but in each case the final roller was heated so that the temperature of the protein on the roller was 80° C. In each example, an acceptable chunk of improved appearance was formed.

EXAMPLE 20, 21, 22, 23 and 24,

Examples 1, 3, 4, 8 and 14 were repeated and the food product was passed through a steam tunnel as it left the final roller. In each example, an acceptable chunk of improved appearance was formed.

EXAMPLE 25

A wet proteinaceous mass was formed by mincing a quantity of fresh ox trachea and steam rendering at 128° C. for 60 minutes and separating from its juices and adding 10% by weight of powdered, dried cattle hide. The rendered ox trachea had a gel-strength value of 390, and the dried cattle hide had a gel-strength value of 160 g. The wet proteinaceous mass obtained was passed directly through a series of rollers and subsequently processed as described in Example 1. 40% of the total protein was inert scleroprotein in the product which came off the roller.

EXAMPLE 26

The process of Example 25 was followed except that beef flank which had been minced and was unrendered and 10% dried cow hide was used. The dried cow hide had a gel-strength value of 160 g. 30% of the total protein was inert scleroprotein in the product which came off the roller.

EXAMPLE 27

Rendered pork skin having a gel-strength value of 180 and 10% of dried cattle hide having a gel-strength value of 160 g was processed in the manner of Example 1 and a sheet of proteinaceous food product was collected from the rollers. The sheet was shredded and passed into a bath of bovine blood plasma which contained 50% by weight of finely minced meats. Rendered pork skin sheet was added to the bath in the proportion of 10% by weight of the meats and plasma. The resultant combination was heat set by raising the temperature of the mixture to 80° C. and holding for five minutes. The set mixture was diced at which point the advantage of including the protein sheet could be seen with increased meat-like appearance over comparative plasma and meat chunks where the protein sheet was absent. The chunks were then heat processed in the manner described in Example 1. 40% of the total protein was inert scleroprotein in the product which came off the roller.

EXAMPLE 28

The process of Example 27 was followed, except that animal whole blood was used in place of bovine plasma and a similar product was formed.

EXAMPLE 29

The process of Example 27 was followed, except that porcine plasma was used in place of bovine plasma; a similar product was formed.

EXAMPLE 30

A wet proteinaceous mass was formed by mixing 85% rendered ground beef, 5% dried blood and 10% dried cow epidermis (source of scleroprotein) having a gel-strength value of 160 g. The wet proteinaceous mass obtained was passed directly through a series of rollers and subsequently processed as described in Example 1. This gave a meat-like chunk. 30% of the total protein was inert scleroprotein in the product which came off the roller.

EXAMPLE 31

Example 30 was repeated except that the wet proteinaceous mass was formed of 60% ground beef, 25% udders, 10% dried cow epidermis having a gel-strength value of 160 g and 5% dried blood. A meat-like chunk was formed. 34% of the total protein was inert scleroprotein in the product which came off the roller.

EXAMPLE 32

Example 30 was repeated except that the wet proteinaceous mass was formed of 50% ground beef, 15.5% tripe, 17.5% udders, 10% dried cow hide having a gel-strength value of 160 g and 5% dried blood. A meat-like chunk was formed. 32% of the total protein was inert scleroprotein in the product which came off the roller.

EXAMPLE 33

Example 30 was repeated except that the wet proteinaceous mass was formed of 75% ground beef, 10% bonemeal having a gel-strength value of 70 g, 10% dried bovine tendons having a gel-strength value of 120 g, 5% dried blood. A meat-like chunk was formed. 60% of the total protein was inert scleroprotein in the product which came off the roller.

EXAMPLE 34

Example 30 was repeated except that the wet proteinaceous mass was formed of 74% ground turkey, 5% liver poultry, 6% paddywacks (ligamentus nuchae) having a gel-strength value of 40 g and 15% bone flour having a gel-strength value of 70 g. This gave a meat-like chunk. 50% of the total protein was inert scleroprotein in the product which came off the roller.

EXAMPLE 35

Example 30 was repeated except that the wet proteinaceous was formed of 45% ground poultry necks, 50% ground bovine epidermis having a gel-strength value of 160 g and 5% feathermeal having a gel-strength value of 30 g. A meat-like chunk was formed. 74% of the total protein was inert scleroprotein in the product which came off the roller.

EXAMPLE 36

Example 30 was repeated except that the wet proteinaceous mass was formed of 100% ground epidermis having a gel-strength value of 160 g. A meat-like chunk was formed. 80% of the total protein was inert scleroprotein in the product which came off the roller.

EXAMPLE 37

Example 30 was repeated except that the wet proteinaceous mass was formed of 100% ground paddywacks having a gel-strength value of 40 g. A meat-like chunk was formed. 84% of the total protein was inert scleroprotein in the product which came off the roller.

EXAMPLE 38

Example 30 was repeated except that the wet proteinaceous mass was formed of 98% ground porcine epidermis, 1% PGA, 1% $Na_2CO_3$, and had a gel-strength value of 140 g. The chemically cross-links material with-stood the process, and a meat-like chunk was formed. 95% of the total protein was inert scleroprotein in the product which came off the roller.

COMPARATIVE EXAMPLE 30A

Example 30 was repeated except that the wet proteinaceous mass comprised 100% ground poultry skins having a gel-strength value of 430 g. The product had virtually no structure with near complete gelatin conversion on processing.

COMPARATIVE EXAMPLE 30B

Example 30 was repeated except that the wet protein mass comprised 100% ground porcine epidermis having a gel-strength of 440 g. The product had virtually no structure with near complete gelatin conversion on processing.

EXAMPLE 39

Fresh minced chicken breast was steam heated to 95° C. and held at this temperature for 5 minutes. This caused a reduction in gel-strength value from 700 g to 445 g, that is a reduction to 64% of the gel-strength value of the protein prior to being heated.

The cooked chicken was passed directly through a series of rollers and treated as in Example 1.

The chunks had the appearance and texture of chicken breast meat.

We claim:

1. A process for the preparation of a proteinaceous food product, the process comprising passing a wet dough of meat protein between a pair of oppositely rotating rollers and in contact with said rollers to form a cohesive moist sheet of said food product, the temperature of the meat protein on said pair of rollers being no more than 50° C., the protein being selected from the group consisting of mammalian and avian meat protein, wherein the meat protein is capable of binding to itself under the conditions of the process and is not wholly composed of uncooked meat muscle, and at least a portion of the meat protein is functionally inert.

2. A process according to claim 1 wherein the functionally inert protein has a gel-strength value of from 0 g to 400 g.

3. A process according to claim 1 wherein the functionally inert protein has been cooked or otherwise treated to impart to the protein at least one characteristic of cooked protein.

4. A process according to claim 3 wherein substantially all the protein of the wet dough has been cooked or otherwise treated prior to being passed between the rollers.

5. A process according to claim 1 wherein the functionally inert protein comprises inert scleroprotein.

6. A process according to claim 5 wherein the amount of inert scleroprotein in the product is greater than 20% by weight based on the total amount of protein.

7. A process according to claim 1 wherein the rollers are urged together by a force in the range from $7 \times 10^3$ to $7 \times 10^5$ kg/m$^2$.

* * * * *